US009613235B2

(12) United States Patent
Marcus

(10) Patent No.: US 9,613,235 B2
(45) Date of Patent: Apr. 4, 2017

(54) SYSTEM, METHOD AND APPARATUS FOR ENCODING OF RFID INLAYS

(71) Applicant: Avery Dennison Corporation, Pasadena, CA (US)

(72) Inventor: Chris Marcus, Simpsonville, SC (US)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 0 days.

(21) Appl. No.: 13/798,786

(22) Filed: Mar. 13, 2013

(65) Prior Publication Data

US 2014/0266633 A1    Sep. 18, 2014

(51) Int. Cl.
| H04Q 5/22 | (2006.01) |
| G06K 7/10 | (2006.01) |
| G06K 1/18 | (2006.01) |
| G06K 17/00 | (2006.01) |

(52) U.S. Cl.
CPC .......... G06K 7/10009 (2013.01); G06K 1/18 (2013.01); G06K 17/0025 (2013.01)

(58) Field of Classification Search
CPC ... G06K 17/0025; G06K 1/18; G06K 7/10009
See application file for complete search history.

(56) References Cited

U.S. PATENT DOCUMENTS

| 4,988,186 | A  | * | 1/1991 | Hill et al. ...................... 351/239 |
| 6,626,361 | B2 | * | 9/2003 | Hileman ................... 235/462.01 |
| 2001/0048021 | A1 | * | 12/2001 | Hill et al. .................... 229/92.1 |
| 2005/0116034 | A1 | * | 6/2005 | Satake et al. ................. 235/432 |
| 2007/0017988 | A1 | | 1/2007 | Sureaud et al. |
| 2008/0183722 | A1 | * | 7/2008 | Lane et al. .................... 707/100 |
| 2011/0234398 | A1 | | 9/2011 | Romaine et al. |
| 2013/0176115 | A1 | * | 7/2013 | Puleston et al. ........... 340/10.51 |

FOREIGN PATENT DOCUMENTS

| EP | 1538552 | 6/2005 |
| WO | 20100098810 | 9/2010 |

OTHER PUBLICATIONS

International Search Report dated Jun. 18, 2014 for International Application No. PCT/US2014/023621 filed Mar. 11, 2014.
International Preliminary Report on Patentability and Written Opinion dated Sep. 15, 2015 for International Application No. PCT/US2014/023621 filed Mar. 11, 2014.

* cited by examiner

*Primary Examiner* — Omeed Alizada
(74) *Attorney, Agent, or Firm* — Avery Dennison Retail Information Services, LLC

(57) ABSTRACT

A method, system and apparatus for encoding an RFID inlay incorporated in an object, the object having indicia disposed thereon. The system can include an object transporting mechanism, a scanner for scanning the indicia, at least one RFID antenna for encoding the RFID inlay, and a processor in communication with and adapted to control the operation of the object transporting mechanism, the scanner, and the at least one RFID antenna.

13 Claims, 3 Drawing Sheets

SYSTEM, METHOD AND APPARATUS FOR ENCODING OF RFID INLAYS

BACKGROUND OF THE INVENTION

The use of radio frequency identification (RFID) tags, tickets, labels and inlays to track, identify and locate goods has grown significantly in recent years. RFID tags allow manufacturers, distributors and retailers, amongst others, to regulate products and inventory, quickly determine production, manufacture, distribution or retail needs and efficiently intake and outtake items utilizing RFID tags. The RFID tags themselves can provide any desired product data and may be scanned or read in any of a variety of manners in order to retrieve the information contained on the chip on the RFID tag.

RFID inlays are typically incorporated into labels or card stock to form tags that can be applied to items or item packaging either directly through the use of adhesive or indirectly such as through a fastener, e.g. string, plastic tie, etc. Labels and tags incorporating RFID inlays can complement the advantages of RFID with visual indicia, such as barcodes, alphanumeric identifiers, descriptive text, variable and fixed, and pictographic information. For example, in a retail environment, an apparel hang tag can incorporate an RFID inlay and can further include graphic information such as the brand of the product, fixed indicia such as product description, variable indicia such as product size, price, care, product identifying information such as a barcode, and so forth.

Typically, the visual indicia are imaged onto a sheet of labels by a printing press or similar printing platform, such as flexographic or gravure. Known RFID tag and ticket printing platforms do not have the ability to encode chips on RFID inlays. Certain labels incorporating RFID inlays exiting a printing platform may include pre-printed variable data for encoding a chip included with a RFID inlay. However, the chip on the RFID inlay must be encoded such that the encoded data matches the pre-printed variable data displayed on the label. If the printed information does not match the encoded information, the tag, inlay and printing are rejected and result in additional waste and cost to the brand owner and manufacturer.

SUMMARY OF THE INVENTION

According to at least one exemplary embodiment, a system encoding a RFID tag, label or inlay incorporated in or with an object, the object having indicia disposed thereon, is described. The system can include an object transporting mechanism, a scanner for scanning the indicia, at least one RFID antenna for encoding the chip on the RFID inlay, and a processor in communication with and adapted to control the operation of the object transporting mechanism, the scanner, and the at least one RFID antenna.

According to another exemplary embodiment an apparatus for encoding a chip as part of a RFID tag, label or inlay incorporated in or associated with an object is described. The apparatus can include a digital printing platform for printing fixed and/or variable information and an object transporting mechanism for transporting the object from a first location to a second location, a scanner disposed between the first location and the second location, the scanner adapted to read encoding data present in indicia disposed on the object, and at least one RFID antenna disposed between the first location and the second location and in communication with the scanner, the at least one RFID antenna having read and write capabilities for encoding the chip with the RFID inlay based on the encoding data.

According to another exemplary embodiment, a method for encoding a chip on a RFID inlay is described. The method can include providing an object incorporating an RFID inlay and having indicia disposed thereon, obtaining encoding data from the indicia, and encoding the chip on the RFID inlay with the encoding data.

In a still further exemplary embodiment of the presently described invention, A system for producing RFID inlays for use as RFID tags, tickets and labels, is disclosed and includes a digital printing platform for printing variable and fixed indicia on a substrate containing a number of RFID inlays, with each of the inlays having a chip and antenna connected to the chip. The system further includes a computer connected to the digital printing platform to provide printing instructions to the digital printing platform; and a feeding and encoding device for feeding and encoding each of the RFID inlays and the feeding and encoding device connected to the computer to verify encoded information contained in one of the variable or fixed indicia.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION OF THE INVENTION

Figure 1:
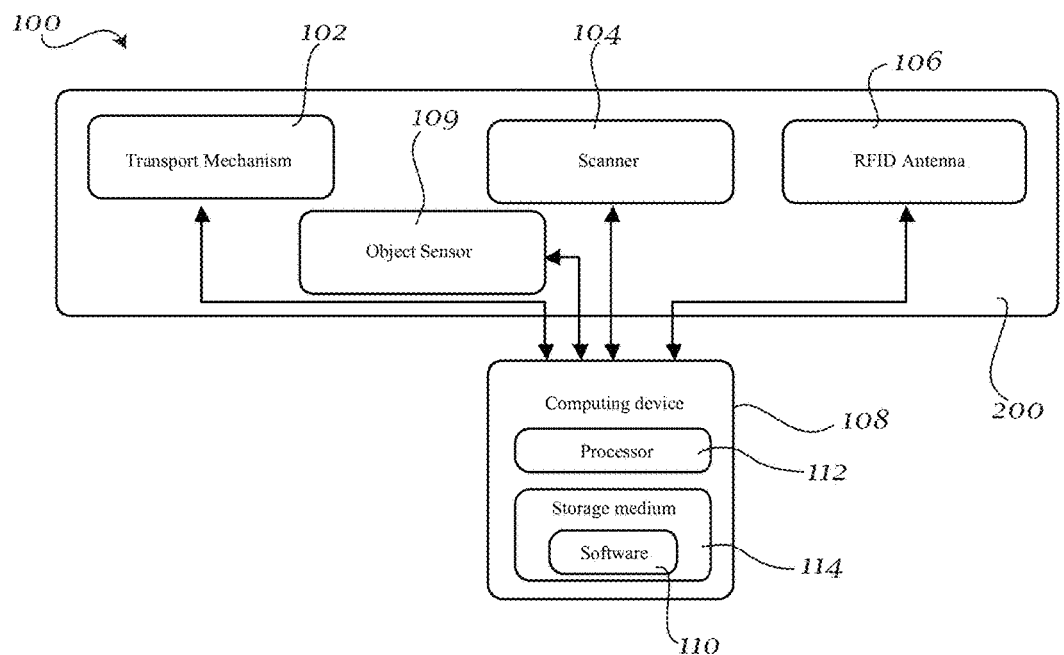
FIG. 1 shows an exemplary embodiment of a system for encoding RFID inlays.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

According to at least one exemplary embodiment, a system, method and apparatus for encoding a chip on a RFID inlay is disclosed. The system may be adapted to encode RFID inlays that are incorporated into objects, for example RFID inlays laminated into labels, hang tags, or the like or intermediate assemblies that will become tags, labels or tickets. The objects can have indicia printed thereon, wherein the indicia include data that is to be encoded into the chip on the RFID inlay. The system may be adapted to read the printed indicia, convert the encoding data into a desired format such as EPC, and subsequently encode the RFID inlay with the converted encoding data. The system may further include quality control and error handling procedures, allowing the system to verify encoded RFID tags and reject the RFID tags that fail the verification test. The indicia is printed for example by using a digital printing platform which can vary the printed information from inlay to inlay or portion of a substrate to another portion of the substrate. For example, a sheet of material which may make up multiple hang tags or tickets, can be printed with fixed indicia and then each area that will become a separate ticket will have variable printing provided thereon.

FIG. 1 is a diagram of an exemplary embodiment of a system 100 for encoding of RFID inlays. When referring to encoding RFID inlays, tags, tickets or labels, this refers to encoding a chip or circuit that is applied to the surface of the inlay to which a RFID antenna is connected. System 100 can include a transport mechanism 102, a scanner 104, and at least one RFID antenna 106. Each of mechanism 102, scanner 104 and antenna 106 may be communicatively and operatively coupled to a computing device 108 running software 110 for managing the RFID encoding process. The computing device 108 can include a processor 112 for executing software 110 and a non-transitory computer readable medium 114 on which software 110 may be stored. Computing device 108 can further include at least one communications adapter for communicating with mechanism 102, scanner 104 and antenna 106. The computing device 108 can also be connected to a printing device so as to coordinate the printing of indicia on the inlay. Communications between computing device 108 and components 102, 104, 106 may be bidirectional. In some exemplary embodiments, transport mechanism 102, scanner 104, and RFID antenna 106 may be provided in an encoding apparatus 200. In some exemplary embodiments, system 100 can further include an object sensor 109, communicatively and operatively coupled to computing device 108, for detecting the presence of object on transport mechanism 102. Object sensor 109 may be disposed proximate scanner 104.

Figure 2:
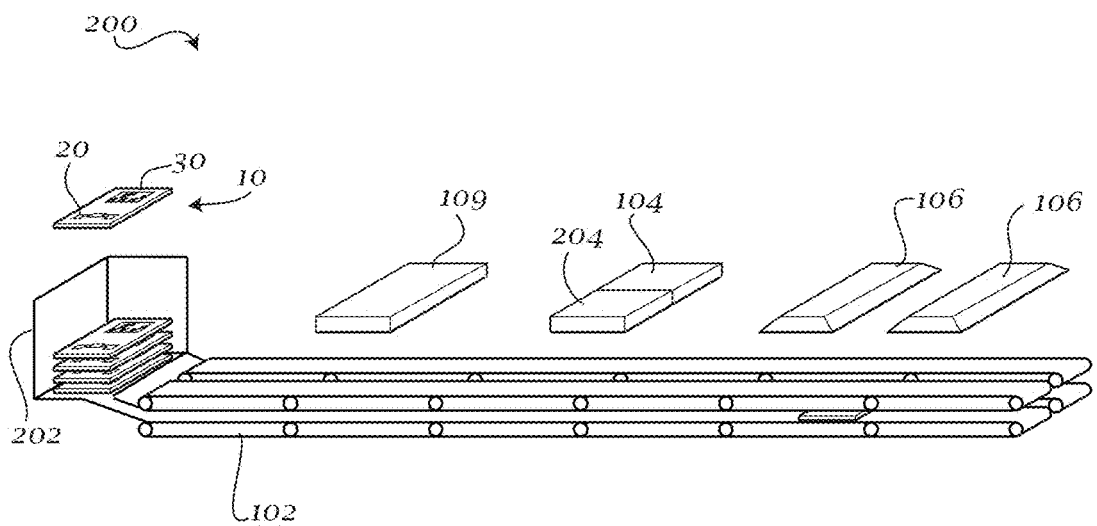
FIG. 2 shows an exemplary embodiment of an apparatus for encoding RFID inlays.

Turning to FIG. 2, an exemplary embodiment of an encoding apparatus 200 is shown.

The transport mechanism 102 of the encoding apparatus can serve to transport objects 10 having RFID inlays 20 incorporated therein from a first location to a second location. The transport mechanism may be any device that allows apparatus 200 and system 100 to function as described herein. It may also be a device that can be connected to a printing device so as to enable continuous processing of the RFID tags, tickets, labels and inlay. In some exemplary embodiments, transport mechanism 102 may be a friction feeder assembly. Furthermore, in some exemplary embodiments, a storage receptacle 202 may be disposed proximate the first location, allowing a plurality of objects 10 to be stored therein prior to transport on transport mechanism 102. A non-limiting example of a transport mechanism for use with system 100 and apparatus 200 is the Multifeeder® 250IP XLD friction feeder, available from Multifeeder Technology of White Bear Lake, Minn., or a similar device. Additionally, transport mechanism 102 may be adapted to interface with computing device 108 and software 110 such that the operation of transport mechanism 102 may be controlled by computing device 108. The communication between transport mechanism 102 and computing device 108 may be bidirectional. In some exemplary embodiments, the transport mechanism 102 and computing device 108 may communicate with each other via a standard command set. Such a command set may include, identifying commands, feed setup commands, fault commands, positioning commands, and state reset commands.

The objects 10 may be any desired object having an RFID inlay 20 therein and having indicia 30 disposed thereon. Objects 10 may further be substantially planar objects, having a plurality of laminated layers, with RFID inlays 20 laminated therein. Examples of such objects may be adhesive labels, apparel hang tags, tickets, and so forth. Objects 10 may further have indicia disposed thereon. The indicia 30 may include barcodes, which may be 1-dimensional or 2-dimensional barcodes, as well as other machine readable or scannable codes as well as alphanumeric information. Included in indicia 30 may be information for encoding the RFID inlays 20 disposed within the objects 10. The encoding data may be provided in any suitable format. In some exemplary embodiments, this data may be a hexadecimal representation of the data that is to be programmed into the RFID tag or inlay. Furthermore, some or all of the indicia 30 may only be readable when illuminated by ultraviolet lighting. In some exemplary embodiments, the indicia 30 may have an excitation wavelength of about 254 nm to about 365 nm, and an emission wavelength of about 614 nm.

Once placed on transport mechanism 102, the objects 10 can be transported past scanner 104 and at least one RFID antenna 106. The transport mechanism 102 and/or storage receptacle 202 can be adapted to feed objects 10 to the storage mechanism 102 at predetermined feed intervals. The feed intervals can be determined so as to introduce spacing between any two adjacent objects 10, with the spacing being of sufficient size such that interference and cross-coupling between the tags of any two adjacent objects can be minimized or eliminated. In some exemplary embodiments, the objects 10 may be fed one-at-a-time from storage receptacle 202 past scanner 104 and at least one RFID antenna 106. Furthermore, transport mechanism 102 may have a length sufficient to allow the other components of apparatus 202, such as scanner 104, illumination source 204, at least one RFID antenna 106, and object sensor 109 to be mounted thereon.

Scanner 104 may be any known scanner that is capable of reading 1-dimensional and 2-dimensional barcodes in any format. In some exemplary embodiments, scanner 104 may also include optical character recognition capabilities so as to allow scanner 104 to read alphanumeric data. An ultraviolet illumination source 204 may be operatively coupled to scanner 104 so as to enable scanner 104 to read UV-sensitive barcodes. The UV illumination source 204 may be adapted to emit light at wavelengths of between about 254 to about 365 nm. A non-limiting example of a scanner 104 for use with system 100 and apparatus 200 may be a 2-dimensional barcode scanner such as the Cognex Dataman 300, available from Cognex Corporation of Needham, Mass. or similar device.

At least one RFID antenna 106 may be adapted for writing to, reading, and locking RFID inlays. In some exemplary embodiments, the reading, writing and locking functionalities may be provided in a single RFID antenna 106. In other exemplary embodiments, the reading, writing, and locking functionalities may be provided in a plurality of RFID antennas 106. As non limiting examples, RFID antennas for use with system 100 and apparatus 200 may be one or more of the ThingMagic M5e RFID reader, available from Trimble Navigation Ltd. of Westminster, Colo., the Impinj Guardrail RFID antenna, the Impinj Matchbox RFID antenna, available from Impinj Corporation of Seattle, Wash., or similar devices.

Figure 3:
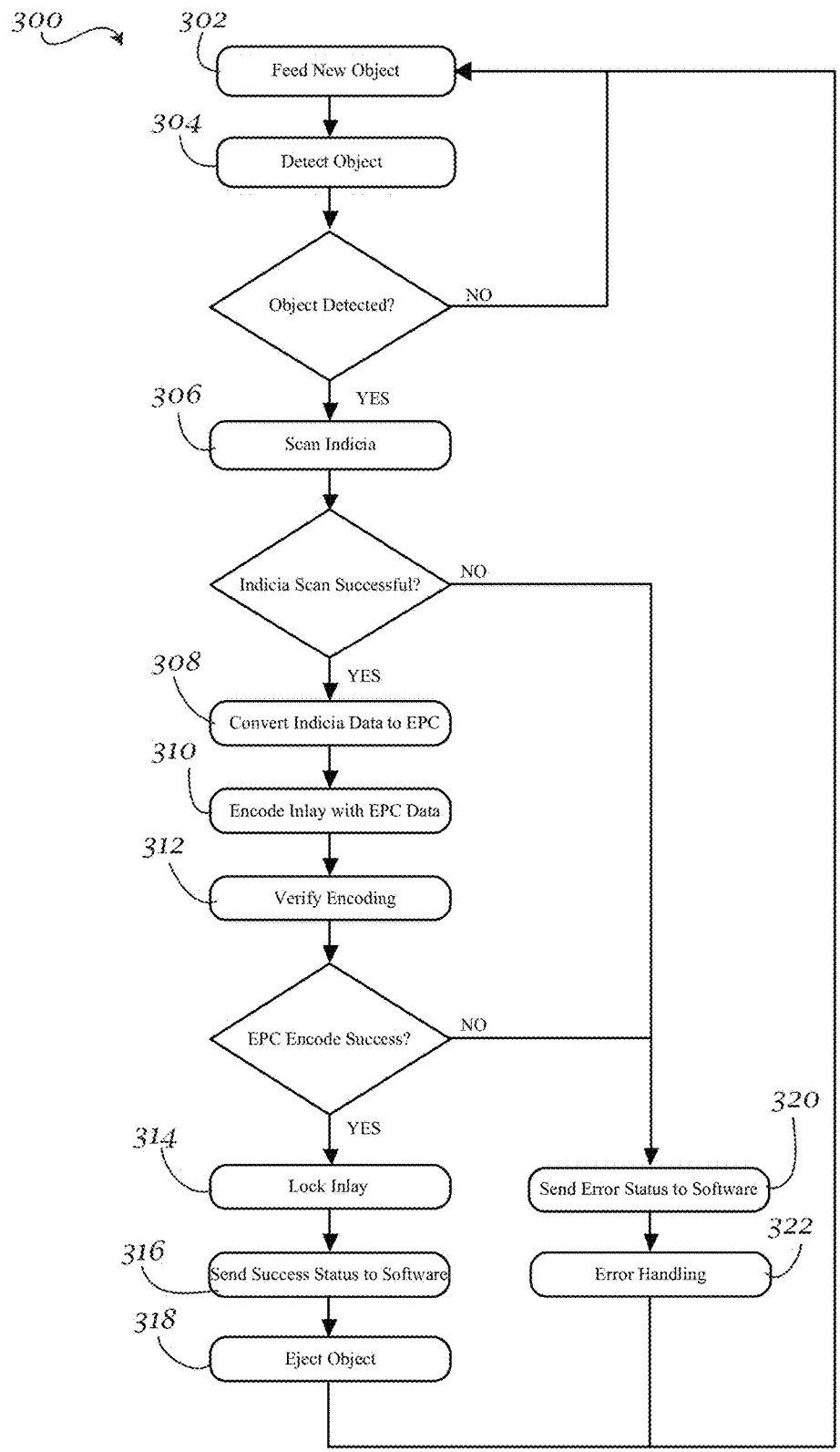
FIG. 3 shows an exemplary embodiment of a method for encoding RFID inlays.

FIG. 3 shows an exemplary method for encoding an RFID inlay 300. At step 302, an object 10 having an RFID inlay 20 incorporated therein may be fed via transport mechanism 102 towards scanner 104. At step 304, object sensor 109 may detect the presence of an object 10 on transport mechanism 102. If no object is detected, steps 302-304 may be repeated until an object is detected.

When an object is detected, scanner 104 can scan the indicia present on the object, at step 306. In some exemplary embodiments, the UV source 204 may illuminate the object so as to allow scanner 104 to scan UV-sensitive indicia.

If the indicia scan is not successful, apparatus 200 may communicate with computing device 108 and send an error status to software 110, at step 320. Subsequently, apparatus 200 can perform an error handling procedure at step 322.

If the indicia scan is successful, encoding data provided in the indicia may be converted, at step 308, to the Electronic Product Code (EPC) format. In some exemplary embodiments, conversion may be performed by components of apparatus 200. In further exemplary embodiments, the data may be communicated from scanner 104 to computing device 108, wherein conversion may be performed by software 110.

Subsequently, at step 310, the RFID inlay may be encoded by RFID antenna 106 with the encoding data obtained at step 308. The RFID inlay may then be read so as to verify the encoding, at step 312. If the encoding is not successful, apparatus 200 may communicate with computing device 108 and send an error status to software 110, at step 320. Subsequently, apparatus 200 can perform an error handling procedure at step 322.

If the encoding step is successful, the RFID inlay may then be locked, at step 314. Upon locking, at step 316, apparatus 200 may communicate with computing device 108 and send a success status to software 110, notifying the software that the RFID inlay was successfully encoded and locked. The success status message can further include the ID of the RFID inlay that was successfully encoded, which can be recorded by software 110. Apparatus 200 can then eject the object at step 318, for example by transporting the object downstream of RFID antenna 106, and into any desired receptacle containing successfully encoded tags.

For tags that fail any of the above steps, for example scanning step 306 or encoding step 310, an error status may be sent to software 110. The error status can contain any desired information, for example an exception message and an identification of the step that the particular RFID inlay failed to pass. This data may further be recorded by software 110. The error handling procedure step 322 may include any desired steps. For example, in some embodiments, the error handling procedure can include stopping transport mechanism 102 until the object having the failed RFID tag is manually removed and the encoding process manually restarted. In other exemplary embodiments, the error handling procedure can include rejecting the object having the failed RFID tag by transporting the object into any desired receptacle for unsuccessfully encoded tags. To that end, encoding apparatus 200 may include a sorting device so as to be able to direct successfully encoded tags to one location, and failed tags to another location. Furthermore, any other error handling steps may be contemplated and provided as desired.

In some exemplary embodiments, system 100 may be adapted to include a plurality of encoding apparatuses 200. Each encoding apparatus 200 may be communicatively coupled to computing device 108. Each encoding apparatus 200 may include a distinct identifier, allowing the plurality of encoding apparatuses 200 to be controlled from a single computing device 108.

Figure 4:
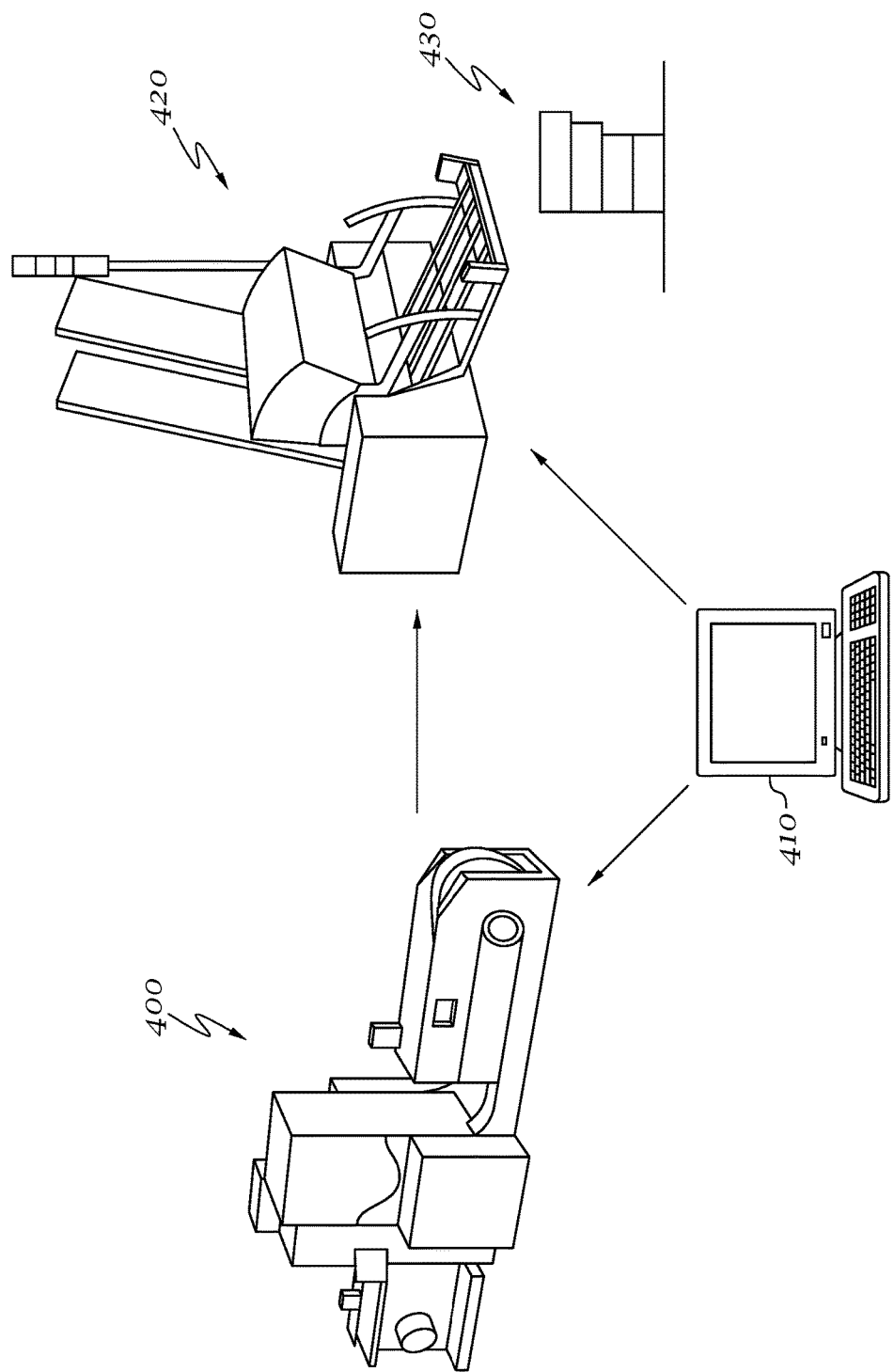
FIG. 4 provides a schematic of the system used in connection with the present invention.

Reference is now directed to FIG. 4 which shows a digital printing platform 400, such as an Indigo® available from Hewlett Packard Corporation of Palo Alto, Calif. The digital printer 400 receives print instructions from a computer 410 which may be located at the same site as the digital printer 400 or located at a remote site. Once print information is received from the computer 410 by the digital printer 400, the printer 400 prints substrates that will become the label, tag or tickets in which a RFID inlays may already be inserted. That is, the RFID inlays are positioned within the substrate as predetermined location so that when the sheet or web is cut, individual tags, tickets or labels are created having RFID inlays therein. The digital printer prints both variable and non-variable information as already described herein.

Still with reference to FIG. 4, the feeder/encoding device 420 receives the individual RFID tags, tickets or labels and then scans the printed indicia and then encodes the individual RFID inlays as previously disclosed. Some sort of cutter (not shown), mechanical die cutter, laser cutter or the like may be included between the printer and feeder to cut the substrate, whether provided in a sheet or web form, into individual RFID tags, tickets and inlays. Information may also be received from the computer 410 such as verification of the EPC code to encode the RFID inlay so that it matches the indicia that was scanned from the printed portion of the substrate. The RFID tags, tickets and labels are then collected 430 in a stack to be distributed for subsequent attachment or association with consumer items such as apparel, garments, or other consumer goods.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for encoding an RFID inlay incorporated in an object, the object having indicia disposed thereon, comprising:
   an object transporting mechanism;
   an internal scanner for scanning the indicia;
   at least one RFID antenna for encoding the RFID inlay;
   a processor in communication with and adapted to control the operation of the object transporting mechanism, the scanner, and the at least one RFID antenna;
   a sorting device configured to direct successfully encoded tags to one location and failed tags to another location;
   an object sensor that detects a presence of the object on the object transporting mechanism and the object sensor is coupled to a computing device in communication with the processor, and
   a quality control and error handling procedures;
   an ultraviolet illumination source;
   a non-transitory computer readable medium coupled to the processor;
   instructions stored on the medium and executable by the processor, the instructions including data read by the scanner; and data to be sent to the at least one RFID antenna.

2. An apparatus for encoding an RFID inlay incorporated in an object, comprising:
   an object transporting mechanism for transporting the object from a first location to a second location;
   a scanner disposed between the first location and the second location, the scanner adapted to read encoding data present in indicia disposed on the object;
   an object sensor that detects a presence of the object on the object transporting mechanism and coupled to a computing device;
   at least one RFID antenna disposed between the first location and the second location and in communication with the scanner, the at least one RFID antenna having read and write capabilities for encoding the RFID inlay based on the encoding data; and
   a quality control and error handling procedure;
   a sorting device configured to direct a successfully encoded RFID inlay to one location and a rejected RFID inlay into a receptacle for unsuccessfully encoded inlays; and
   a transporting mechanism.

3. The apparatus of claim 2, wherein the first location comprises an object storage receptacle.

4. The apparatus of claim 2, further comprising an ultraviolet illumination source.

5. The apparatus of claim 2, wherein the object transporting mechanism is adapted to prevent interference between RFID inlays of any two adjacent objects.

6. The apparatus of claim 2, wherein the scanner is adapted to read barcodes.

7. A method for encoding an RFID inlay, comprising:
   providing an object incorporating an RFID inlay and having indicia disposed thereon; detecting the object via an object sensor that is coupled to a computing device;
   obtaining encoding data from the indicia;
   encoding the RFID inlay with the encoding data, the encoding data may be provided as a hexadecimal string;
   verifying the encoding in a quality control and error handling procedure; and
   sorting using a sorting device configured to direct a successfully encoded RFID inlay to one location and a failed RFID inlay to another location;
   locking the RFID inlay after encoding; and
   communicating with the computing device to send a success status to software indicating that the RFID inlay was successfully encoded.

8. The method of claim 7, wherein the object is a label.

9. The method of claim 7, wherein the indicia comprise a barcode.

10. The method of claim 7, wherein the indicia are visible.

11. The method of claim 7, wherein the indicia are UV-sensitive.

12. The method of claim 7, further comprising converting the encoding data to EPC data after obtaining the encoding data.

13. The method of claim 7, further comprising verifying the RFID inlay after encoding.

* * * * *